(12) United States Patent
Vavrina et al.

(10) Patent No.: US 8,862,288 B2
(45) Date of Patent: Oct. 14, 2014

(54) VEHICLE BASE STATION

(71) Applicant: The Boeing Company, Chicago, IL (US)

(72) Inventors: Matthew A. Vavrina, Silver Spring, MD (US); John L. Vian, Renton, WA (US); Jonathan P. How, Arlington, MA (US); Bernard J. Michini, Plymouth Meeting, PA (US); Matthew A. Michini, Plymouth Meeting, PA (US); Tuna Toksoz, Mountain View, CA (US); Joshua Redding, American Fork, UT (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/663,608

(22) Filed: Oct. 30, 2012

(65) Prior Publication Data
US 2013/0081245 A1    Apr. 4, 2013

Related U.S. Application Data

(63) Continuation-in-part of application No. 12/814,322, filed on Jun. 11, 2010, which is a continuation-in-part of application No. 12/782,525, filed on May 18, 2010.

(60) Provisional application No. 61/617,312, filed on Mar. 29, 2012.

(51) Int. Cl.
*B60S 9/00* (2006.01)

(52) U.S. Cl.
USPC ................. 701/3; 320/109; 414/373

(58) Field of Classification Search
USPC .......................... 701/3, 1, 36; 320/109, 104; 414/390–392, 395–396; 705/1.1
See application file for complete search history.

(56) References Cited

U.S. PATENT DOCUMENTS

| | | | |
|---|---|---|---|
| 755,087 A | 3/1904 | Ward | |
| 4,450,400 A | 5/1984 | Gwyn | |
| 5,091,687 A | 2/1992 | Meyer et al. | |
| 5,301,765 A | 4/1994 | Swanson | |
| 5,612,606 A | 3/1997 | Guimarin et al. | |
| 5,668,460 A | 9/1997 | Lashlee et al. | |
| 5,760,569 A | 6/1998 | Chase, Jr. | |
| 5,909,100 A | 6/1999 | Watanabe et al. | |
| 5,951,229 A * | 9/1999 | Hammerslag | 414/398 |
| 5,998,963 A | 12/1999 | Aarseth | |
| 6,014,597 A | 1/2000 | Kochanneck | |
| 6,813,257 B1 | 11/2004 | Emmons et al. | |
| 7,489,926 B2 | 2/2009 | Whelan et al. | |
| 8,164,300 B2 * | 4/2012 | Agassi et al. | 320/104 |
| 8,164,302 B2 | 4/2012 | Capizzo | |
| 8,183,821 B2 | 5/2012 | Sakurai | |
| 2007/0113921 A1 | 5/2007 | Capizzo | |

(Continued)

FOREIGN PATENT DOCUMENTS

WO   WO 2008128991   10/2008

*Primary Examiner* — Tan Q Nguyen
(74) *Attorney, Agent, or Firm* — Toler Law Group, PC

(57) ABSTRACT

A vehicle base station comprises a platform on which a vehicle may be positioned, a first battery bay located on a first side of the platform, a battery replacement assembly to remove a battery from the vehicle and to replace the battery with a new battery, and a power source adapted to provide power to the vehicle while the vehicle is positioned on the platform.

18 Claims, 12 Drawing Sheets

(56) References Cited

U.S. PATENT DOCUMENTS

| | | |
|---|---|---|
| 2008/0006459 A1 | 1/2008 | Niebuhr |
| 2008/0033684 A1 | 2/2008 | Vian et al. |
| 2009/0212157 A1 | 8/2009 | Arlton et al. |
| 2009/0299582 A1 | 12/2009 | Anderson |
| 2010/0145717 A1 | 6/2010 | Hoeltzel |
| 2012/0123628 A1 | 5/2012 | Duggan et al. |

* cited by examiner

VEHICLE BASE STATION

RELATED APPLICATIONS

This application claims priority from U.S. Provisional Patent Application 61/617,312 to Vavrina, et al., entitled VEHICLE BASE STATION, filed Mar. 29, 2012, the disclosure of which is incorporated herein by reference in its entirety. This application is a continuation-in-part of U.S. patent application Ser. No. 12/814,322, to Vian, entitled VEHICLE BASE STATION, and of U.S. patent application Ser. No. 12/782,525 to Emad W. Saad, entitled VEHICLE BASE STATION, the disclosures of which are incorporated herein by reference in their respective entireties.

BACKGROUND

The subject matter described herein relates to vehicle base stations, and more particularly to a vehicle base station that includes a platform for loading material on one or more autonomous vehicles such as an unmanned aerial vehicle (UAV) or the like.

Autonomous vehicles have found increased utility in industrial, law enforcement, and military applications. Examples of autonomous vehicles include drone aircraft and robotic vehicles. Some autonomous vehicles are powered, at least in part, by batteries. Thus, battery power provides a meaningful limitation on the ability to use autonomous vehicles in a persistent fashion, particularly in remote locations. Accordingly, systems and methods to enable autonomous vehicles to remove batteries or other payload and reload fresh batteries or other payload may find utility.

BRIEF DESCRIPTION OF THE DRAWINGS

The detailed description is described with reference to the accompanying figures.

SUMMARY

Figure 1:
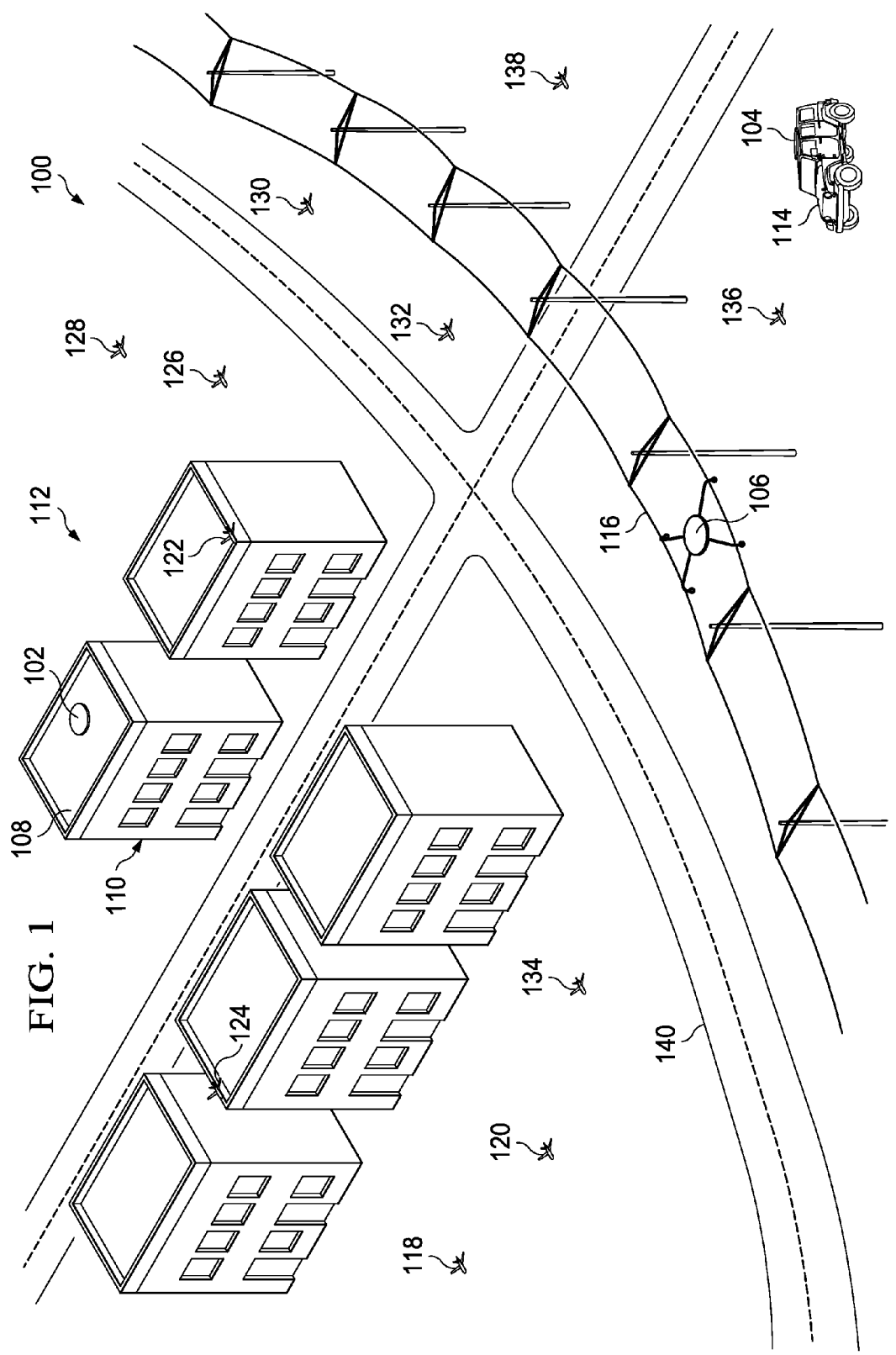
FIG. 1 is an illustration of an unmanned aerial vehicle environment in accordance with an embodiment.

Described herein is an exemplary system to load and unload batteries from a vehicle. In some embodiments a vehicle base station comprises a platform on which a vehicle may be positioned, a first battery bay located on a first side of the platform, a battery replacement assembly to remove a battery from the vehicle and to replace the battery with a new battery, and a power source adapted to provide power to the vehicle while the vehicle is positioned on the platform.

In another embodiment, a system comprises a battery receiver comprising a first frame having a base mountable to a vehicle; a channel coupled to the base; a battery carriage, comprising a second frame capable of holding one or more batteries, a rail mounted on the second frame and adapted to engage the channel coupled to the base of the battery receiver frame, and a vehicle base station, comprising a platform on which a vehicle may be positioned, a first battery bay located on a first side of the platform, a second battery bay located on a second side of the platform, opposite the first side, a battery replacement assembly to remove a battery from the vehicle and to replace the battery with a new battery, and a power source adapted to provide power to the vehicle while the vehicle is positioned on the platform.

In another embodiment a method to replace a battery on a vehicle comprises positioning the vehicle on a platform of a vehicle base station, providing power continuously to the vehicle while the vehicle is positioned on the vehicle base station, aligning a first battery bay comprising a charged battery with a first side of a battery receiver coupled to the vehicle, aligning a second battery bay, which is empty, with a second side of the battery receiver, opposite the first side, sliding a first battery from the first battery bay onto the battery receiver coupled to the vehicle, and sliding a second battery from the battery receiver coupled to the vehicle onto the second battery bay.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, components, and elements have not been illustrated or described in detail so as not to obscure the particular embodiments.

One embodiment of a vehicle loading platform will be described with reference to an unmanned aerial vehicle (UAV) environment. An unmanned aerial vehicle (UAV) is an aircraft that is capable of flying without human operators being present in the aircraft. Unmanned aerial vehicles may be controlled from a remote location. At this remote location, a human operator or a program executed by a computer generates commands for the unmanned aerial vehicle. Unmanned aerial vehicles also may be controlled using a program running on a computer or other controller on the unmanned aerial vehicle.

Unmanned aerial vehicles are used for a number of different purposes. In military and security applications, unmanned aerial vehicles may be used to perform missions that may include, for example, without limitation, reconnaissance missions, attack missions, and/or other suitable types of missions. Unmanned aerial vehicles also may be used in a number of civilian applications. For example, without limitation, unmanned aerial vehicles may be used to perform surveying, firefighting, and/or other suitable types of missions.

Unmanned aerial vehicles may come in a number of different sizes and shapes. Unmanned aerial vehicles may, for example, take the form of fixed wing aircraft, helicopters, and/or ornithopters. For example, without limitation, an unmanned aerial vehicle may take the form of an airplane, a helicopter, or some other suitable type of device capable of flying. The size of an unmanned aerial vehicle may vary greatly. For example, an unmanned aerial vehicle may have a wing span from about a few inches to about 200 feet, depending on the type of unmanned aerial vehicle.

Smaller unmanned aerial vehicles are referred to as micro air vehicles. These types of air vehicles may be configured to be carried by a person and may be launched by throwing the micro air vehicles in the air. The small size of these types of air vehicles allows this type of launching method to provide sufficient velocity for these air vehicles to begin flight. The size of unmanned aerial vehicles has been reduced in part because of a reduction in the sizes of sensors, motors, power supplies, and controllers for these types of vehicles.

Reductions in vehicle size and cost make it possible to operate these vehicles in large numbers. For example, micro air vehicles (MAVs) may be operated in numbers that are about the size of a squad or platoon, as compared to operating one or two larger unmanned aerial vehicles. This type of operation increases the monitoring that can be performed for a particular area. These types of unmanned aerial vehicles also may land on a perch, a building, or another location. In this manner, a micro air vehicle may monitor a particular location without having to continue flight. The micro air vehicle may be repositioned if the area of interest changes.

For example, a micro air vehicle may land on a building in a city or town. The micro air vehicle may monitor a particular road or building in the city. Micro air vehicles, however, have limitations with their smaller size, as compared to larger unmanned aerial vehicles. For example, the processing power and data transmission ranges may be more limited for micro air vehicles, as compared to larger unmanned aerial vehicles. Further, the range of these micro air vehicles may be shorter, as compared to the larger unmanned aerial vehicles.

Various embodiments described herein provide a vehicle base station for autonomous vehicles including unmanned aerial vehicles. In some embodiments, a base station comprises a housing defining at least one platform to support at least one vehicle carrying a payload, a vehicle docking assembly to align the payload at a desired location on the platform, and a payload replacement assembly to remove the payload from the vehicle and to replace the payload with a new payload. Various aspects of embodiments of vehicle base stations and unmanned aerial vehicles will be explained with reference to the figures, below.

With reference to FIG. 1, an illustration of an unmanned aerial vehicle environment is depicted in accordance with an embodiment. Unmanned aerial vehicle environment 100 includes unmanned aerial vehicle base station 102, unmanned aerial vehicle base station 104, and unmanned aerial vehicle base station 106.

In the example depicted in FIG. 1, unmanned aerial vehicle base station 102 is located on rooftop 108 of building 110 within a town 112. Unmanned aerial vehicle base station 104 is associated with vehicle 114. A first component may be considered to be associated with a second component by being secured to the second component, bonded to the second component, fastened to the second component, and/or connected to the second component in some other suitable manner. The first component also may be connected to the second component by a third component. The first component may be considered to be associated with the second component by being formed as part of and/or an extension of the second component.

Unmanned aerial vehicle base station 106 is located on power lines 116. Unmanned aerial vehicle base stations 102, 104, and 106 may be deployed in a number of different ways. Unmanned aerial vehicle base station 102 may be dropped off by helicopter on rooftop 108. The location of unmanned aerial vehicle base station 102 on rooftop 108 may result in unmanned aerial vehicle base station 102 being less observable. Further, this location may provide a better line of sight between unmanned aerial vehicle base station 102 and communication arrays. In this manner, the range at which unmanned aerial vehicle base station 102 may communicate with unmanned aerial vehicles may be increased.

Unmanned aerial vehicle base station 104 is associated with vehicle 114. By being associated with vehicle 114, unmanned aerial vehicle base station 104 may be moved periodically or constantly. This type of deployment may reduce the discoverability of unmanned aerial vehicle base station 104. Further, by providing mobility to unmanned aerial vehicle base station 104, greater flexibility may be present for performing missions. In addition, unmanned aerial vehicle base station 104 may be removed from vehicle 114 and placed on the ground or in some other suitable location.

Unmanned aerial vehicle base station 106 may be deployed onto power lines 116 by being dropped by a helicopter, on a parachute, or some other suitable mechanism. Unmanned aerial vehicle base station 106 may be less observable on power lines 116. As depicted, unmanned aerial vehicles, such as unmanned aerial vehicles 118, 120, 122, 124, 126, 128, 130, 132, 134, 136, and 138 may operate from unmanned aerial vehicle base stations 102, 104, and 106.

In these illustrative examples, unmanned aerial vehicle base stations 102, 104, and 106 provide a base from which the different unmanned aerial vehicles may transmit data, receive instructions, recharge, be stored, and/or perform other operations.

Additionally, unmanned aerial vehicles may travel from base station to base station. In other words, unmanned aerial vehicle base stations 102, 104, and 106 may provide a network to extend the range of unmanned aerial vehicles. Having multiple unmanned aerial vehicle base stations also may provide backup in case one unmanned aerial vehicle base station malfunctions or fails to perform as needed.

As can be seen in this depicted example, unmanned aerial vehicle base stations 102, 104, and 106 may be placed in locations where detection of those base stations may be reduced. These locations may include other locations other than those illustrated in this particular example. For example, unmanned aerial vehicle base stations 102, 104, and 106 may be placed in trees, in brush, and/or in other suitable locations.

The unmanned aerial vehicles may be used to perform a number of different missions in unmanned aerial vehicle environment 100. In this illustrative example, the unmanned aerial vehicles may monitor for undesired activity. For example, the undesired activity may be the placement of an improvised explosive device in roadway 140. In another example, the unmanned aerial vehicles may monitor for movement of vehicles or people. In still other examples, unmanned aerial vehicles may be used to monitor for construction of structures.

Figure 2:
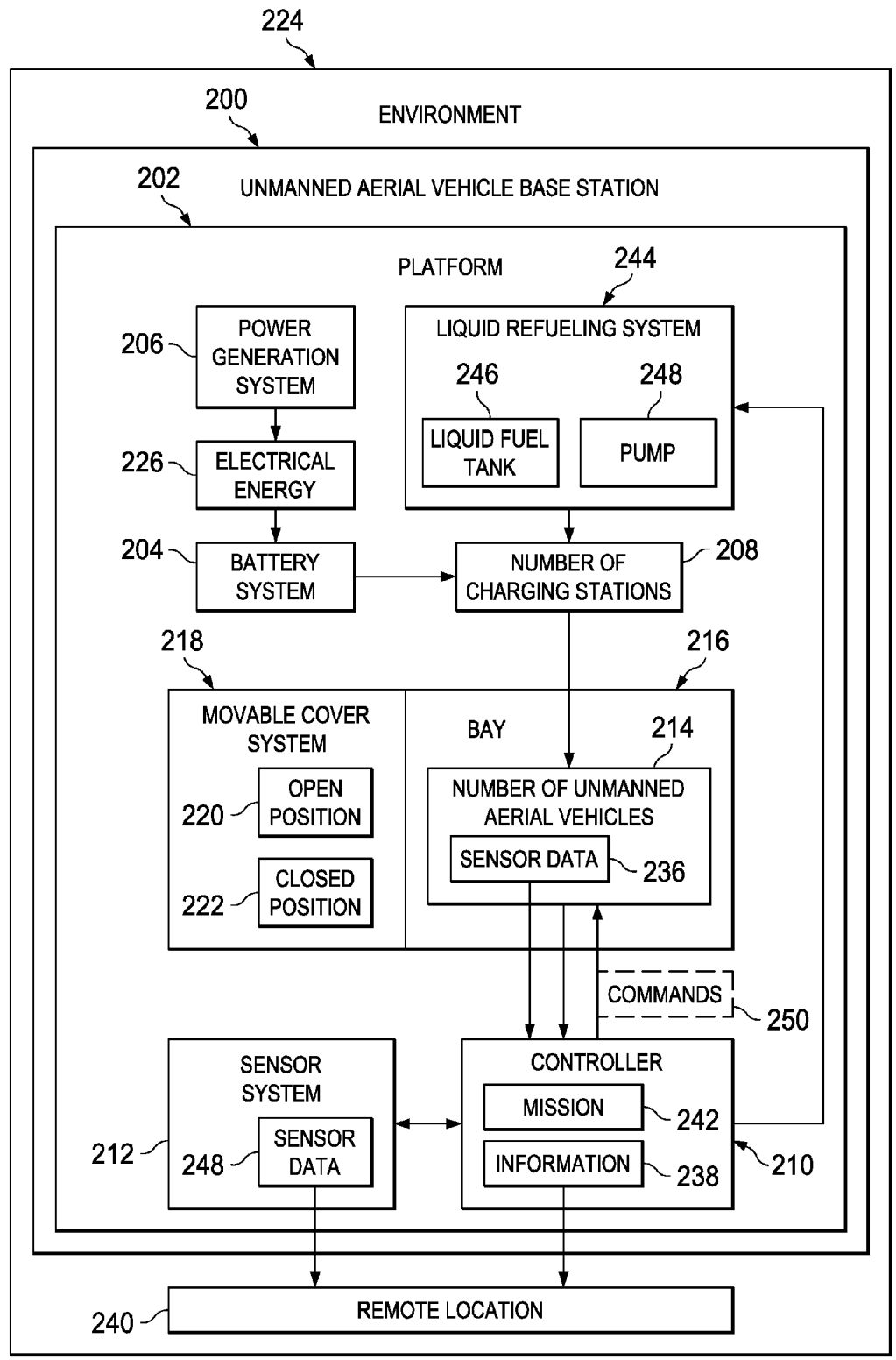
FIG. 2 is a schematic illustration of a block diagram of an unmanned aerial vehicle base station in accordance with an embodiment.

With reference now to FIG. 2, an illustration of a block diagram of an unmanned aerial vehicle base station is depicted in accordance with an advantageous embodiment. Unmanned aerial vehicle base station 200 is an example of an unmanned aerial vehicle base station that may be used to implement unmanned aerial vehicle base stations 102, 104, and 106 in FIG. 1.

In this illustrative example, unmanned aerial vehicle base station 200 comprises platform 202, battery system 204, power generation system 206, number of charging stations 208, controller 210, sensor system 212, and/or other suitable components.

Platform 202 is configured to hold one or more unmanned aerial vehicles 214. In other words, number of unmanned aerial vehicles 214 may be placed in and/or stored in or on platform 202. For example, platform 202 may have bay 216 in which number of unmanned aerial vehicles 214 may land. Bay 216 may be an area of platform 202 surrounded by walls with an opening on the top side of platform 202. In other advantageous embodiments, bay 216 may have walls and a roof with an opening on the side of platform 202. An unmanned aerial vehicle is considered to be housed when the unmanned aerial vehicle enters into or lands on platform 202.

Additionally, platform 202 may be configured to provide protection from environment 224 for number of unmanned aerial vehicles 214 when number of unmanned aerial vehicles 214 is housed in platform 202.

Platform 202 also may have movable cover system 218 that is configured to move between open position 220 and closed position 222. Movable cover system 218 may cover bay 216. When movable cover system 218 is in open position 220, number of unmanned aerial vehicles 214 may take off from and/or land in or on platform 202.

When movable cover system 218 is in closed position 222, number of unmanned aerial vehicles 214 located in bay 216 of platform 202 may be protected from environment 224. Further, closed position 222 also provides a configuration for transporting number of unmanned aerial vehicles 214 in unmanned aerial vehicle base station 200.

Battery system 204 and power generation system 206 provide electrical energy 226 for unmanned aerial vehicle base station 200 and number of unmanned aerial vehicles 214. Battery system 204 is optional and stores electrical energy 226 generated by power generation system 206. Power generation system 206 generates electrical energy 226 from environment 224 in which unmanned aerial vehicle base station 200 is located.

A number of charging stations 208 are connected to battery system 204. Charging stations 208 are configured to charge batteries for a number of unmanned aerial vehicles 214 using electrical energy 226. Further, charging stations 208 provide electrical energy 226 to controller 210 and sensor system 212 in unmanned aerial vehicle base station 200.

In some embodiments, aerial vehicles 214 may take the form of liquid fueled unmanned aerial vehicles. In these illustrative examples, charging stations 208 is configured to refuel these liquid fueled unmanned aerial vehicles. For example, unmanned aerial vehicle base station 200 may have liquid refueling system 244. Liquid refueling system 244 has liquid fuel tank 246 containing liquid fuel. The liquid fuel may be, for example, gasoline or diesel fuel. Pump 248 in liquid refueling system 244 transfers the liquid fuel in liquid fuel tank 246 to number of charging stations 208. Charging stations 208 may be configured to provide liquid fuel to the liquid fuel unmanned aerial vehicles.

In these embodiments, controller 210 may be configured to control the pumping of liquid fuel from liquid refueling system 244. In some embodiments, liquid refueling system 244 may deliver liquid fuel to one or more unmanned aerial vehicles 214 at number of charging stations 208 using a syringe injection system.

In these embodiments, controller 210 may be configured to receive sensor data 236 from number of unmanned aerial vehicles 214. Additionally, controller 210 may be configured to generate information 238 from sensor data 236. Information 238 may then be sent to remote location 240. Remote location 240 is a location remote to unmanned aerial vehicle base station 200. The remote location may include a mission planning system or a human operator. Controller 210 may also be configured to program each of number of unmanned aerial vehicles 214 with mission 242. Mission 242 may be the same or different for each of number of unmanned aerial vehicles 214.

Sensor system 212 generates sensor data 248 from environment 224. Sensor data 248 may be sent to remote location 240 or may be used to send commands 250 to number of unmanned aerial vehicles 214.

The illustration of unmanned aerial vehicle base station 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different embodiments.

For example, in some embodiments, different forms of energy may be stored in storage devices for conversion into electrical energy for number of unmanned aerial vehicles 214. These storage devices may be devices other than battery system 204. These devices may include, for example, without limitation, capacitors, flywheels, compressed air devices, and/or other suitable energy storage devices. One or more of these devices may be connected to charging stations 208. In some embodiments a base station may comprise a system to replace a battery pack (or other payload) on a vehicle. Further, a base station may comprise an assembly to recharge one or more batteries. Embodiments of such base station are described below with reference to FIGS. 8A and 8B.

Figure 3:
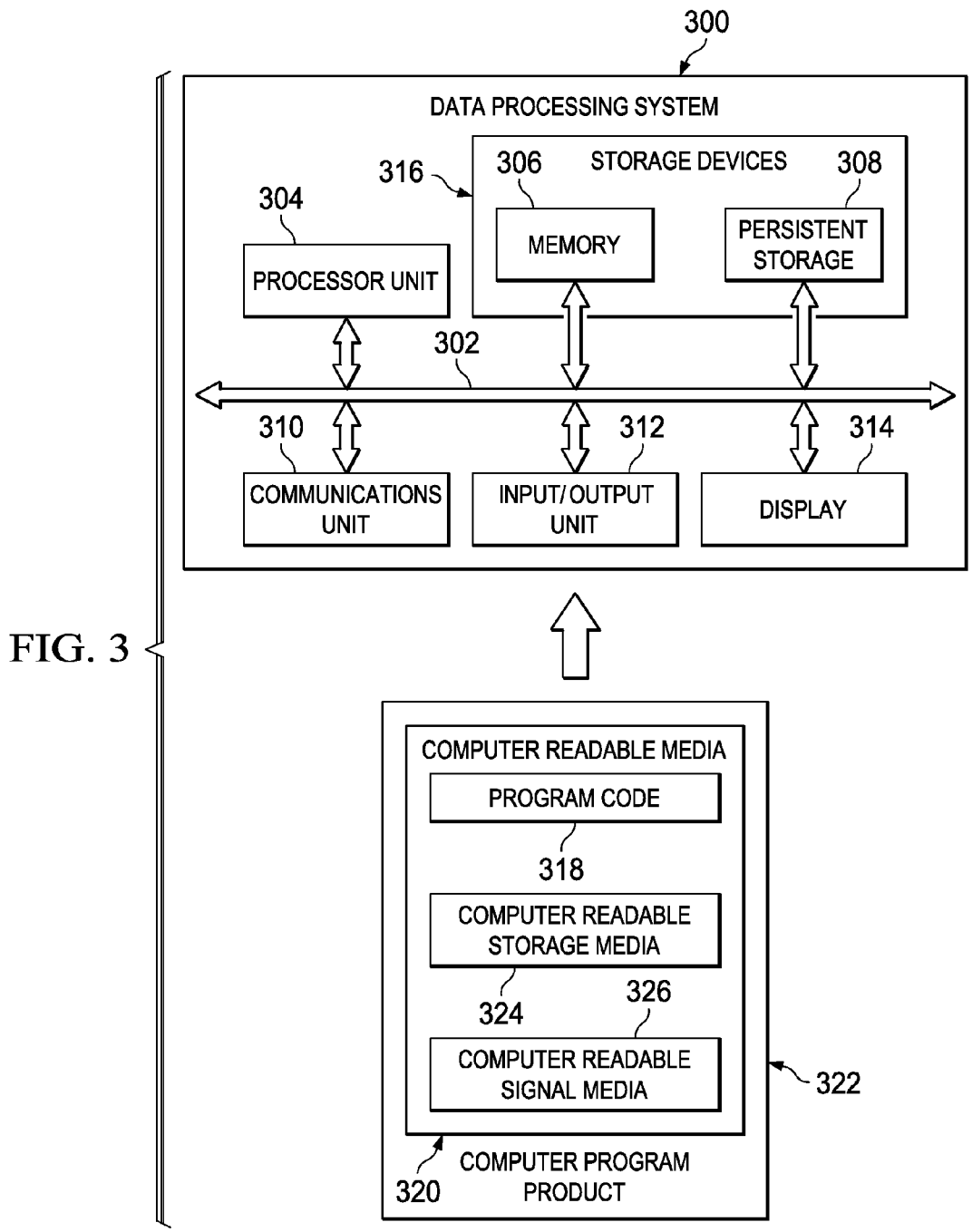
FIG. 3 is a schematic illustration of a block diagram of a data processing system in accordance with an embodiment.

Turning to FIG. 3, an illustration of a block diagram of a data processing system is depicted in accordance with an embodiment. Data processing system 300 is an example of an implementation for controller 210 in FIG. 2. In this illustrative example, data processing system 300 includes communications fabric 302, which provides communications between processor unit 304, memory 306, persistent storage 308, communication unit 310, and input/output (I/O) unit 312.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Memory 306, in these examples, may be, for example, a random access memory or any other suitable volatile or non-volatile storage device.

Persistent storage 308 may take various forms, depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 may be removable. For example, a removable hard drive may be used for persistent storage 308.

Communication unit 310, in these examples, provides for communication with other data processing systems or devices. In these examples, communications unit 310 is a network interface card. Communications unit 310 may provide communications through the use of either or both physical and wireless communications links.

Communications unit 310 is configured to provide wireless communications links. These wireless communications links may include, for example, without limitation, a satellite communications link, a microwave frequency communications link, a radio frequency communications link, and/or other suitable types of wireless communication links.

Input/output unit 312 allows for the input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code, in the different embodiments, may be embodied on different physical or computer readable storage media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322. In one example, computer readable media 320 may be computer readable storage media 324 or computer readable signal media 326.

Computer readable storage media 324 may include, for example, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or flash memory that is connected to data processing system 300. In some instances, computer readable storage media 324 may not be removable from data processing system 300.

Alternatively, program code 318 may be transferred to data processing system 300 using computer readable signal media 326. Computer readable signal media 326 may be, for example, a propagated data signal containing program code 318. For example, computer readable signal media 326 may be an electromagnetic signal, an optical signal, and/or any other suitable type of signal. These signals may be transmitted over communication links, such as wireless communications links, an optical fiber cable, a coaxial cable, a wire, and/or any other suitable type of communication link. In other words, the communication link and/or the connection may be physical or wireless in the illustrative examples.

In some embodiments, program code 318 may be downloaded over a network to persistent storage 308 from another device or data processing system through computer readable signal media 326 for use within data processing system 300. For instance, program code stored in a computer readable storage media in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system, including components in addition to or in place of those illustrated for data processing system 300. Other components shown in FIG. 3 can be varied from the illustrative examples shown. The different embodiments may be implemented using any hardware device or system capable of executing program code. As one example, data processing system 300 may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Figure 4:
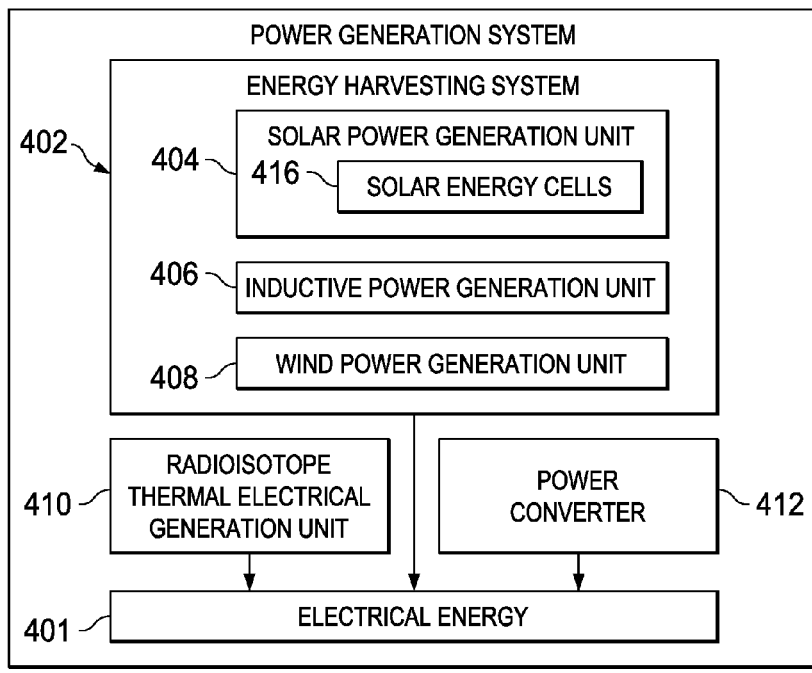
FIG. 4 is an illustration of a block diagram of a power generation system in accordance with an embodiment.

With reference to FIG. 4, an illustration of a block diagram of a power generation system is depicted in accordance with an advantageous embodiment. Power generation system 400 is an example of one implementation for power generation system 206 in FIG. 2. Power generation system 400 generates electrical energy 401 in these illustrative examples.

Power generation system 400 may include energy harvesting system 402. Energy harvesting system 402 may comprise at least one of solar power generation unit 404, inductive power generation unit 406, wind power generation unit 408, and/or other suitable types of energy harvesting units. Power generation system 400 also may include radioisotope thermal electrical generation unit 410, power converter 412, and/or other suitable types of power generation devices, e.g., fuel cells, batteries, electric generators, or electric outlets.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Solar power generation unit 404 generates electrical energy 401 from exposure to sunlight or other light in the environment. Solar power generation unit 404 may comprise solar energy cells 416. In the different illustrative examples, solar energy cells 416 may take the form of photovoltaic units. Solar energy cells 416 may be located on, for example, without limitation, movable cover system 218 in FIG. 2.

Inductive power generation unit 406 generates power inductively when an alternating current source is present, such as in power lines. This power may be used to provide electrical energy 401. Wind power generation unit 408 may include a number of wind power turbines that generate electrical energy 401 from wind that may be present in the environment.

Radioisotope thermal electrical generation unit 410 generates electrical energy 401 from radioactive material that decays. The decay of the radioactive material generates heat used by radioisotope thermal electrical generation unit 410 to generate electrical energy 401. This radioactive material is carried by the unmanned aerial vehicle base station in these examples.

Power converter 412 converts electrical power from one form to another form. For example, power converter 412 may convert alternating current (AC) energy into direct current (DC) energy. Power converter 412 also may change the frequency of alternating current energy as another example. In yet another example, power converter 412 may change the current flow. Power converter 412 may be used when a power source, such as an electrical outlet, is present. In these illustrative examples, power converter 412 converts energy into electrical energy 401 for use by an unmanned aerial vehicle.

Figure 5:
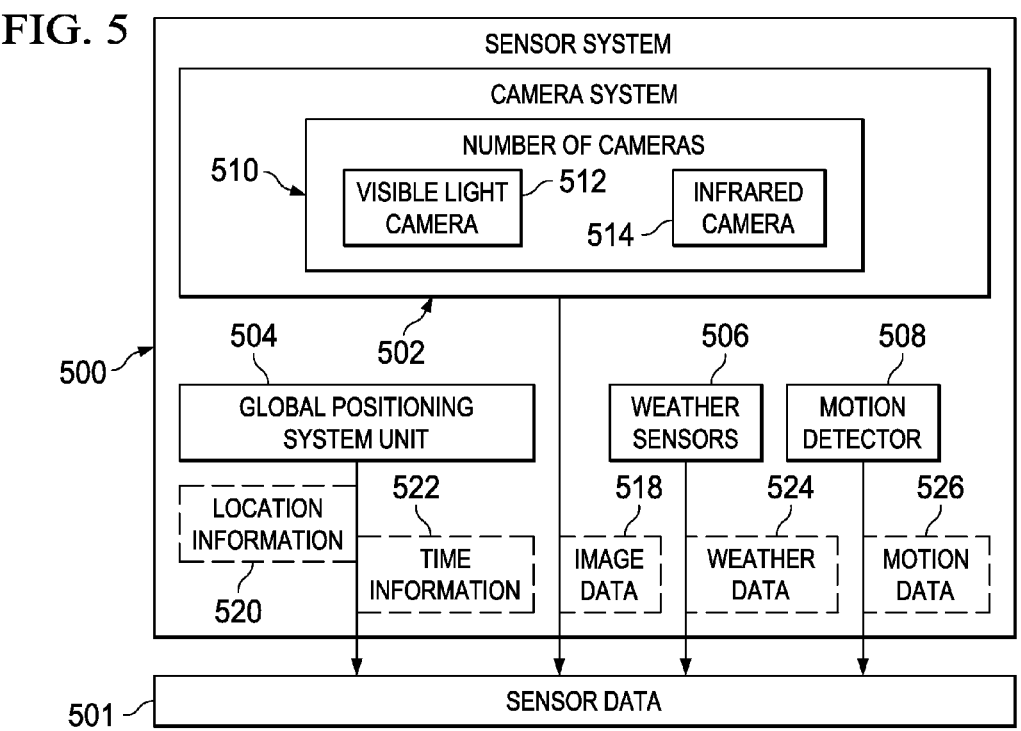
FIG. 5 is an illustration of a block diagram of a sensor system in accordance with an embodiment.

Referring now to FIG. 5, an illustration of a block diagram of a sensor system is depicted in accordance with an advantageous embodiment. Sensor system 500 is an example of one implementation for sensor system 212 in FIG. 2. In these illustrative examples, sensor system 500 generates sensor data 501. Sensor system 500, in this example, includes camera system 502, global positioning system unit 504, weather sensors 506, and motion detector 508.

Camera system 502 may comprise number of cameras 510. Cameras 510 may include at least one of visible light camera 512, infrared camera 514, and other suitable types of cameras. In some advantageous embodiments, visible light camera 512 and infrared camera 514 are combined as part of a multispectral camera.

Camera system 502 generates sensor data 501 in the form of image data 518. Global positioning system unit 504 generates location information 520 in sensor data 501. Location information 520 may include, for example, latitude, longitude, and an elevation. Additionally, time information 522 also may be generated by global positioning system unit 504.

Weather sensors 506 generate weather data 524 in sensor data 501 that may be used to identify weather conditions. For example, weather sensors 506 may generate information about wind speed, pressure, wind direction, humidity, temperature, and/or other suitable information.

Motion detector 508 generates motion data 526 in sensor data 501. Motion detector 508 generates motion data 526 when motion in an area monitored by motion detector 508 is detected.

Figure 6:
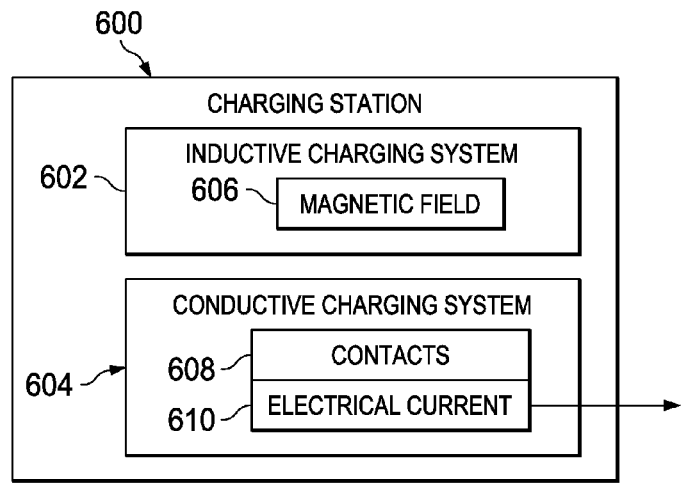
FIG. 6 is an illustration of a block diagram of a charging station in accordance with an embodiment.

Turning now to FIG. 6, an illustration of a block diagram of a charging station is depicted in accordance with an advantageous embodiment. Charging station 600 is an example of an implementation for a charging station within number of charging stations 208 in FIG. 2.

Charging station 600 may comprise at least one of inductive charging system 602 and conductive charging system 604. Inductive charging system 602 generates magnetic field 606. Magnetic field 606 may induce another magnetic field in a coil located within the device being charged. In this manner, the current may be caused to flow in the device being charged without contact between inductive charging system 602 and the device.

Conductive charging system 604 includes contacts 608. Contacts 608 may be placed in physical contact with contacts on the device being charged. This contact allows for electrical current 610 to flow from conductive charging system 604 to the device being charged by charging station 600. In this manner, the device may be charged and/or recharged to perform additional operations or missions.

Figure 7:
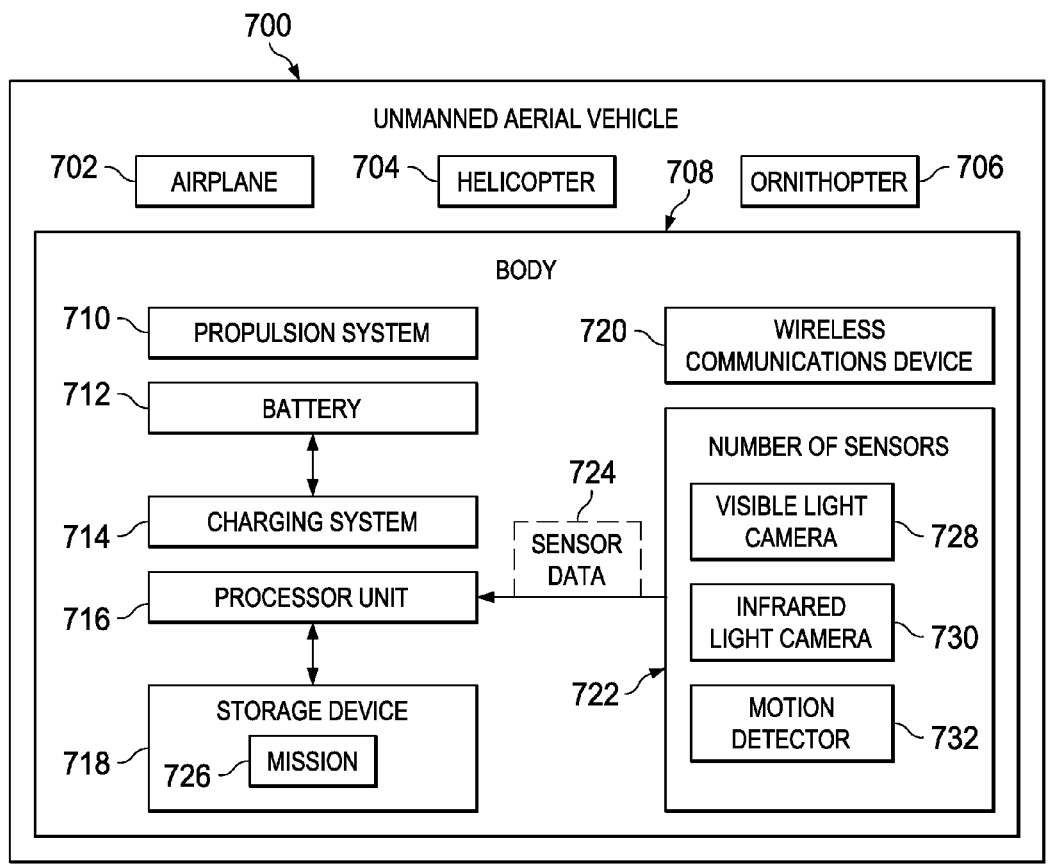
FIG. 7 is an illustration of a block diagram of an unmanned aerial vehicle in accordance with an embodiment.

Turing now to FIG. 7, an illustration of a block diagram of an unmanned aerial vehicle is depicted in accordance with an advantageous embodiment. Unmanned aerial vehicle 700 is an example of one implementation for number of unmanned aerial vehicles 214 in FIG. 2. In some embodiments the vehicles may include manned aerial vehicles or vehicles other than aerial vehicles, e.g., ground vehicles such as cars, trucks, tanks, or the like.

In this illustrative example, unmanned aerial vehicle 700 may take a number of forms. For example, unmanned aerial vehicle 700 may be, for example, without limitation, airplane 702, helicopter 704, ornithopter 706, or some other suitable type of aircraft.

As illustrated, unmanned aerial vehicle 700 comprises body 708, propulsion system 710, battery 712, charging system 714, processor unit 716, storage device 718, wireless communications device 720, and number of sensors 722. Body 708 provides a structure in which the different components of unmanned aerial vehicle 700 may be associated with each other. For example, without limitation, body 708 may be a fuselage. Further, body 708 may include aerodynamic surfaces, such as wings or other types of surfaces.

Propulsion system 710 is configured to move unmanned aerial vehicle 700 in the air. Propulsion system 710 may be, for example, without limitation, an electric motor configured to rotate a propeller or other type of blade. In other advantageous embodiments, propulsion system 710 may be configured to move wings on body 708 when unmanned aerial vehicle 700 takes the form of ornithopter 706. Battery 712 provides electrical energy for unmanned aerial vehicle 700.

Charging system 714 is connected to battery 712 and allows battery 712 to be recharged at a charging station. Charging system 714 may include inductive coils for an inductive charging system or conductive contacts for a conductive charging system. In some advantageous embodiments, charging system 714 also may be used to transfer data. As one illustrative example, charging system 714 may provide a modulated charge as a carrier frequency. This modulated charge allows for the transfer of data in addition to the providing of power.

As another illustrative example, conductive contacts in charging system 714 may be used to transfer data. In other advantageous embodiments, power may be provided wirelessly by charging system 714 using microwaves or a laser.

Processor unit 716 runs a number of programs for missions in these illustrative examples. Storage device 718 may store sensor data 724 generated by sensors 722. Additionally, storage device 718 may store mission 726 that is executed or run by processor unit 716. Mission 726 may be, for example, without limitation, a program, an identification of a target, and/or other suitable types of information.

Wireless communication device 720 is configured to provide communications between unmanned aerial vehicle 700 and a remote location, such as unmanned aerial vehicle base station 200 or remote location 240 in FIG. 2. In these illustrative examples, number of sensors 722 may include, for example, at least one of visible light camera 728, infrared light camera 730, motion detector 732, and/or other suitable types of sensors used to generate sensor data 724 for processing by processor unit 716.

The illustration of unmanned aerial vehicle base station 200 and its components in FIGS. 2-6 and unmanned aerial vehicle 700 in FIG. 7 are not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some embodiments, unmanned aerial vehicle base station 200 may not include movable cover system 218. Instead, bay 216 may be configured to provide protection from environment 224 without moving parts. For example, bay 216 may be a cavity in platform 202 with an opening configured to protect number of unmanned aerial vehicles 214 from environment 224. Additionally, in some embodiments, unmanned aerial vehicle 700 may not have wireless communications device 720. Instead, a wired contact may be used to transfer data from unmanned aerial vehicle 700 to unmanned aerial vehicle base station 200 when unmanned aerial vehicle 700 lands on platform 202.

In some embodiments a vehicle base station 800 may be adapted to include an assembly to automatically remove and/or replace a power source, e.g., a battery, from a vehicle. In embodiments described herein the power source(s) may comprises a modular carriage 900 which is selectably attachable to a battery receiver on the vehicle. Further, the vehicle base station 800 may be adapted to recharge batteries removed from the vehicles.

Figure 8A:
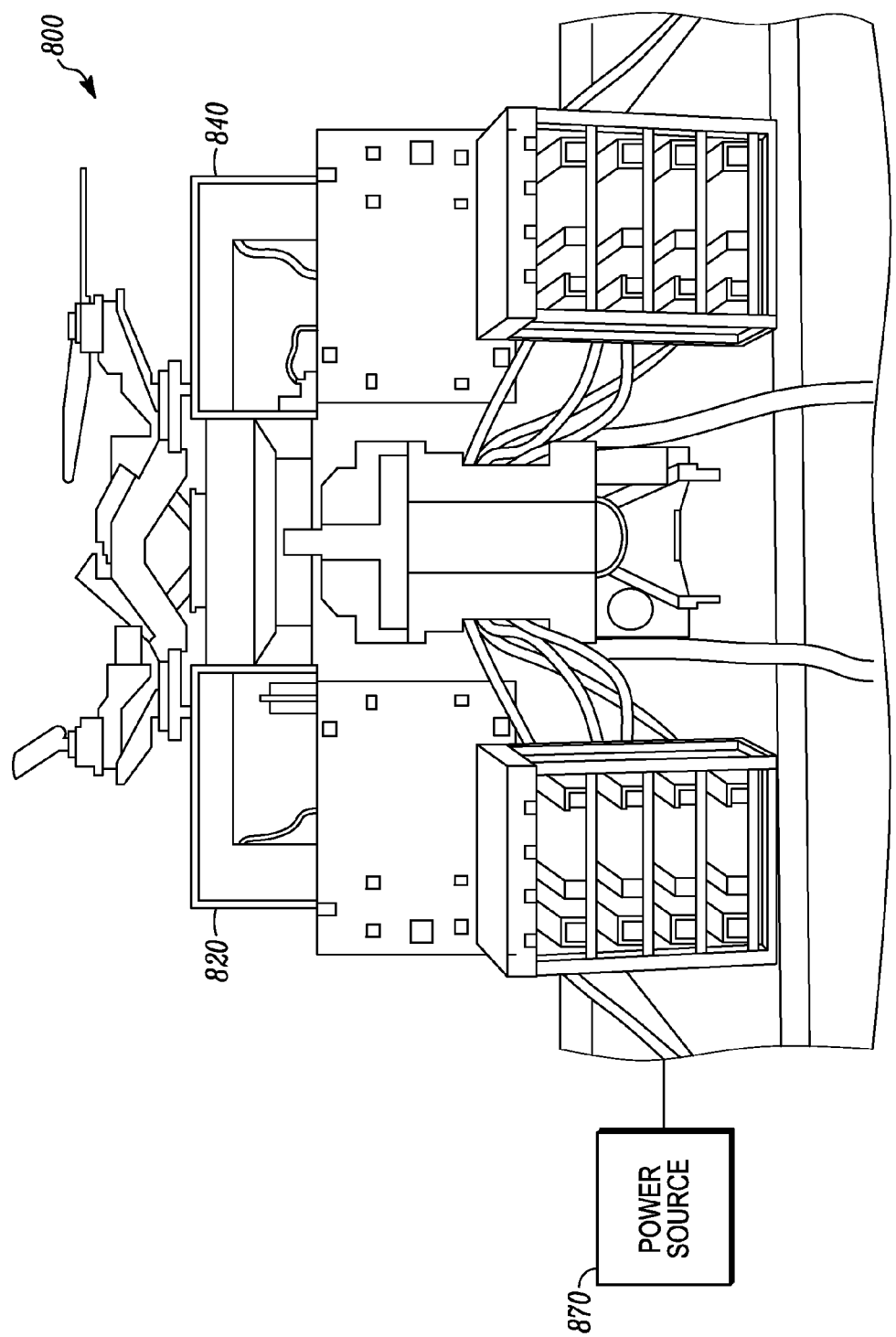
FIG. 8A is a front elevation view of a vehicle base station in accordance with embodiments.
Figure 8B:
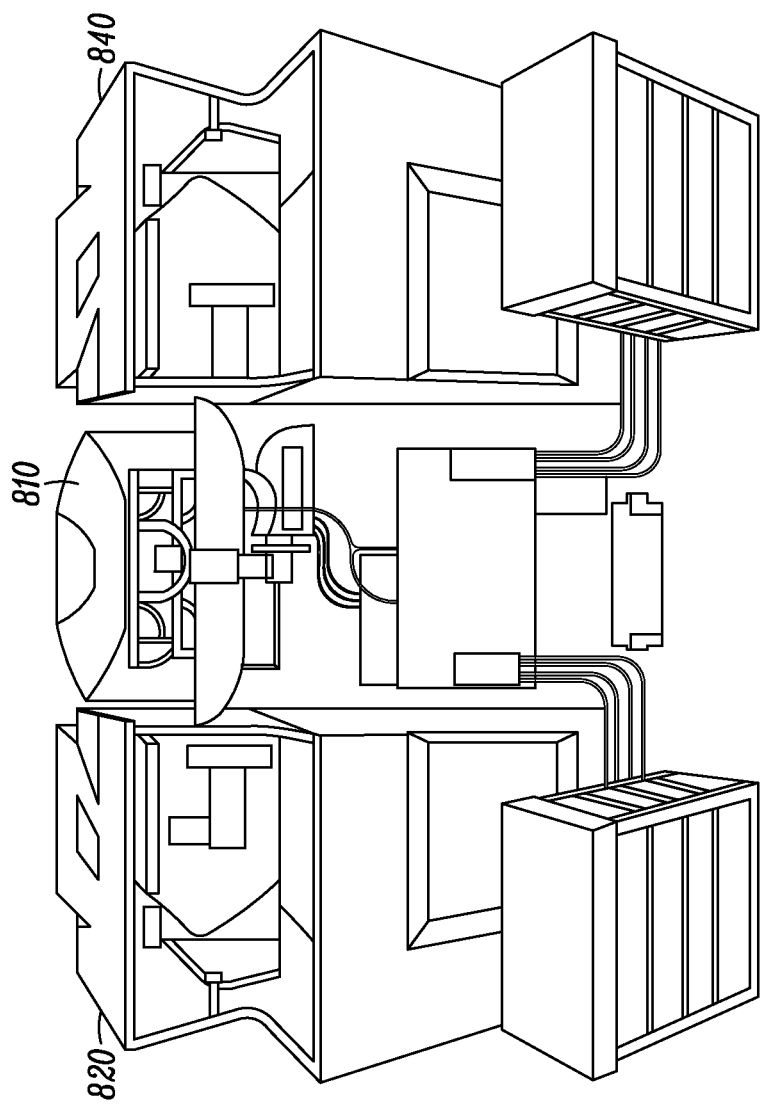
FIGS. 8B and 8C are perspective views of a vehicle base station in accordance with embodiments.
Figure 8C:
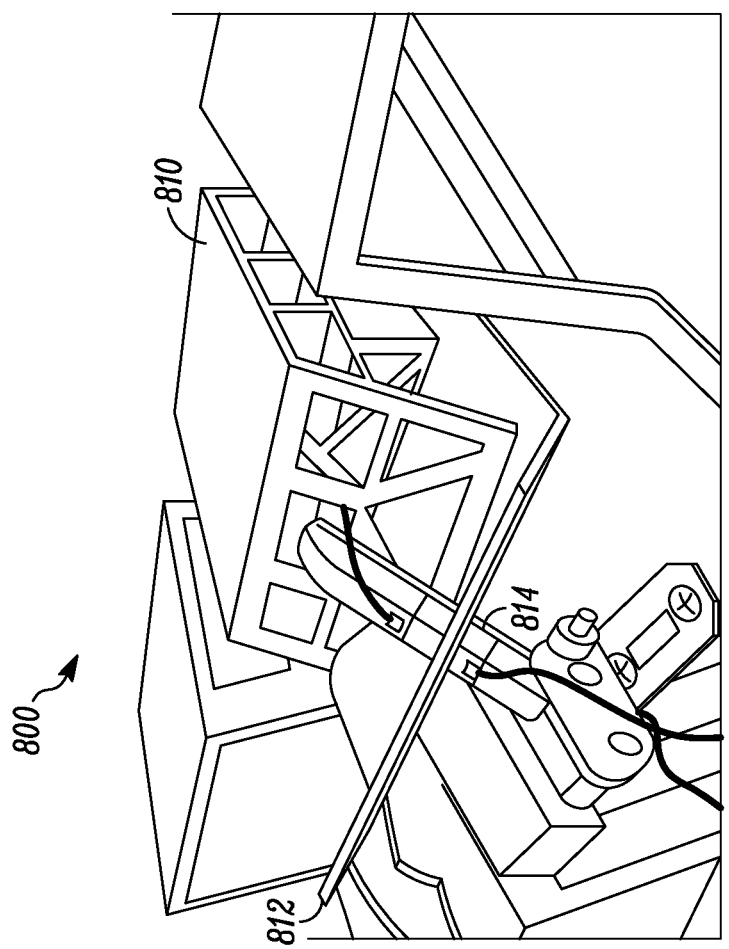

One embodiment of a vehicle base station 800 for the automated battery maintenance can be seen in FIGS. 8A-8C. A vehicle, such as a modified quadrotor, may be placed on a platform 810 comprising a sloped landing plate 812 and is locked down securely with one or more locking arms 814. In some embodiments the platform 810 the sloped landing plate 812 of platform 810 is contoured such that gravity causes the vehicle to be positioned in a predetermined location on the platform. The vehicle base station 800 has a first battery bay 820 and a second battery bay 840. In some embodiments the battery bays 820, 840 each of which comprises a rotating drum having four battery receptacles which can carry and recharge a single battery. The vehicle base station 800 provides the capability to automatically change and charge batteries without requiring intervention of a human operator.

FIGS. 8A-8C and 9A-9C are schematic illustrations of three hardware components of the developed battery maintenance system: the battery carriage (FIG. 9A), the battery receiver (FIG. 9B) and the dual-drum change station (FIGS. 8A-8C). The following sections discuss each of these components in more detail.

Figure 9A:
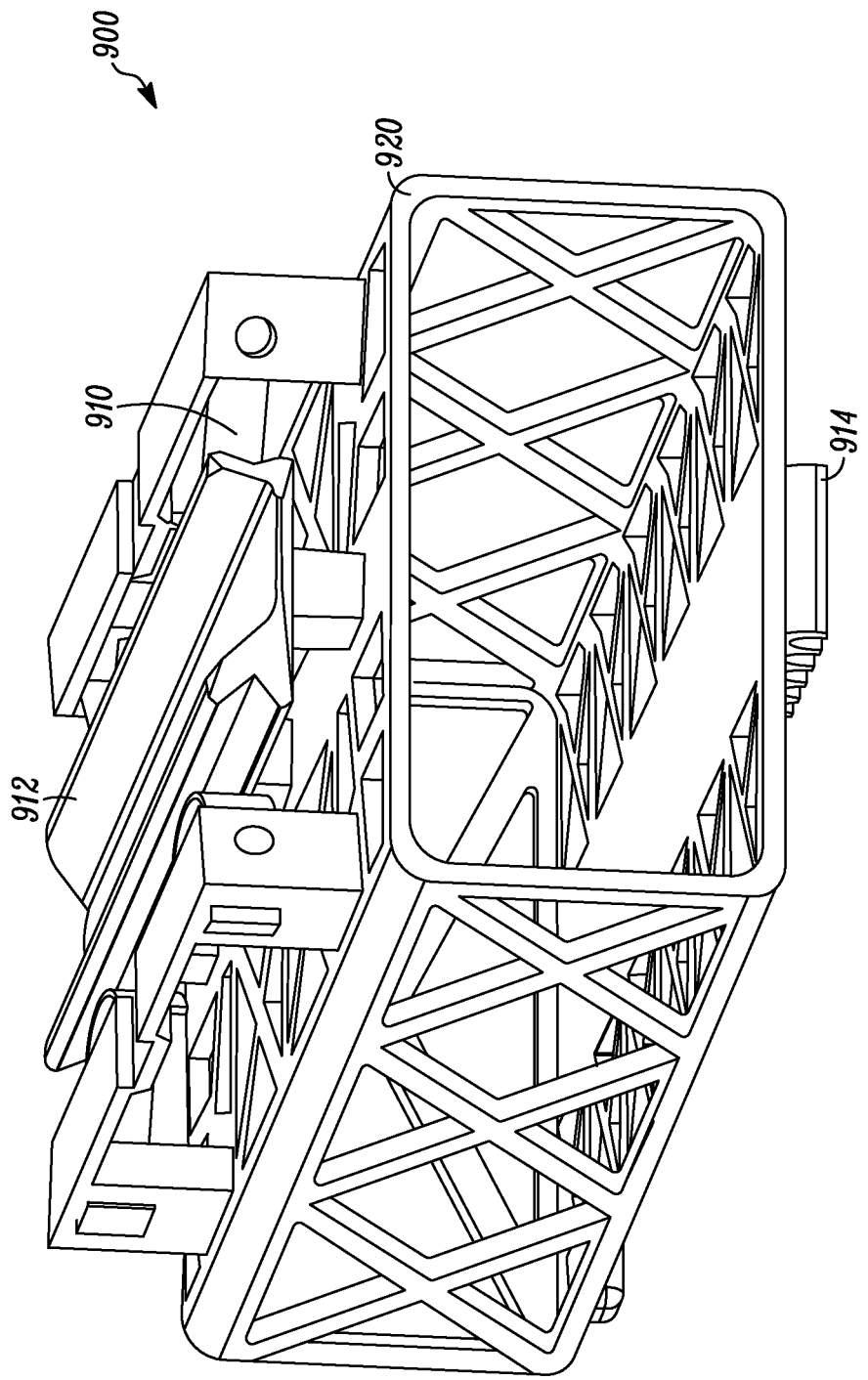
FIG. 9A is a perspective view of a battery carriage according to embodiments.

In order to enable a rapid changing of batteries, a battery carriage 900 has been designed, as shown in FIG. 9a. The carrier 900 is a rectangular prism-shaped frame 920 which may receive a battery. A power contact is provided through curved copper strips 910 on both sides of a T-shaped rail 912. A gear rack 914 is built into the bottom of the carriage which allows linear motion when meshed with pinion gears found in the platform 800.

Figure 9B:
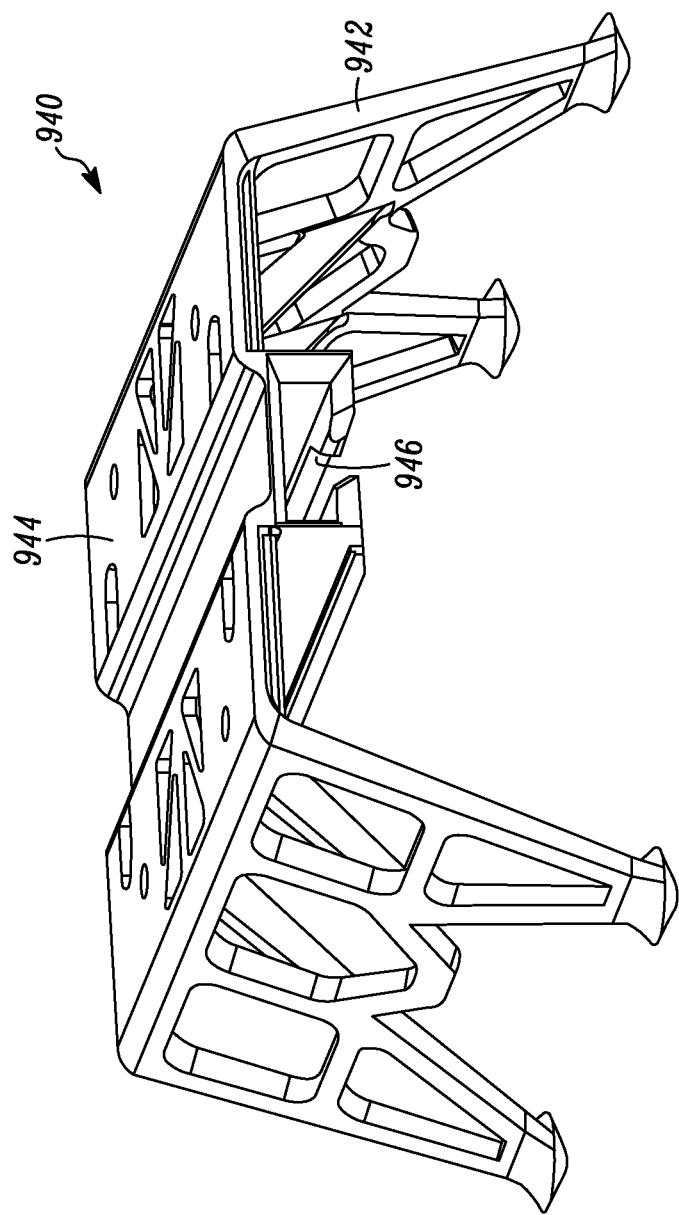
FIG. 9B is a perspective view of a battery receiver according to embodiments.
Figure 9C:
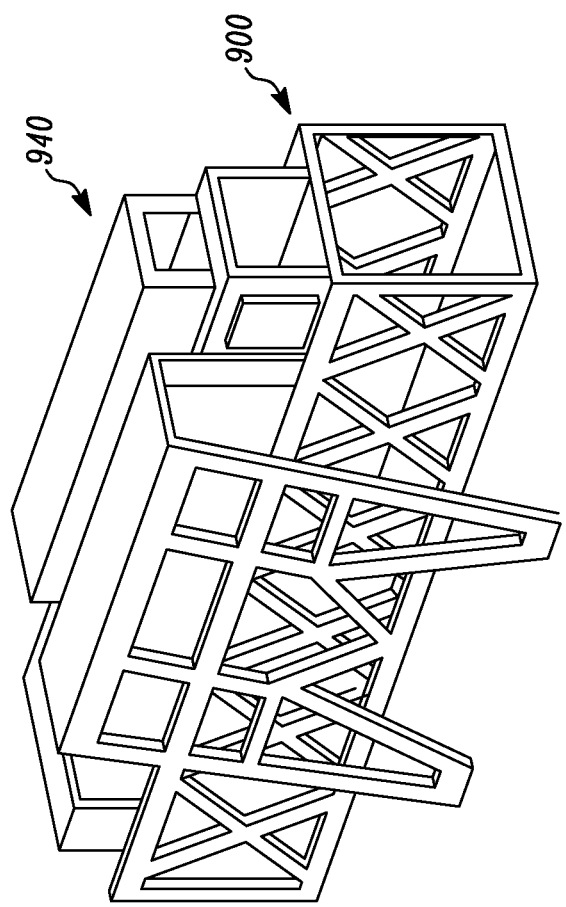
FIG. 9C is a perspective view of a battery receiver and two battery carriages.

FIG. 9B is a schematic illustration of a battery receiver accordance with embodiments. Referring to FIG. 9B, in some embodiments the battery receiver 940 comprises a frame 942 having a base 944 which may be mounted to a vehicle. The frame defines a channel 946 that mates with the T-shaped rail 912 on the battery carriage to secure the battery carriage to the battery receiver, as illustrated in FIG. 9C.

In some embodiments the battery changing/charging process may be controlled through a combination of on-board microcontrollers and an computer. The station 800 includes a total of 5 microcontrollers: one for each drum to control bay pinion motors in the bay, two for charging units to monitor and control charging process on both drums, and one central unit that manages the internal and external communications and controls the center motor, locking arms 814 and both drum rotations.

A central landing platform 810 is situated between two battery bays, 820, 840, each of which are embodied as rotating drums. The drums rotate around a common metal shaft to provide proper concentric alignment. Two stepper motors are used for precision control alignment of the drums with the landing platform 810 and battery receiver. The concurrent unloading of the discharged battery and loading of a charged one is enabled by the dual drum structure.

Each battery bay 820, 840 comprises a printed circuit board (PCB), and a microcontroller. The linear motion of the battery carrier in and out of the receptacles is realized by pinion motors which engage the gear rack 914. The feedback of proper placement of the carriage inside the bay is provided by switches mounted in each bay. The feedback gained from those switches may be used to shut off the pinion motors when the battery is correctly positioned. In addition, electrical connections are provided to continuously charge batteries and measure battery voltage levels.

The center section accommodates a sloped landing plate 810, as shown in FIG. 8C. The four feet of the battery receiver 940 conform to four docking points to assist the quadrotor to its proper position in x, y and z. In addition, two independent locking arms 814, 816 with copper tops, driven by servo motors, grasp the landed quadrotor and ensure its proper alignment, lock it securely to the station, and provide it with shore-power as the battery is swapped. Two infrared emitter/detector sensors on two end of the landing plate are activated when the battery carriage is properly aligned under the quadrotor. This feedback is also used to detect pinion motor failures that may occur when while changing the batteries.

Figure 10:
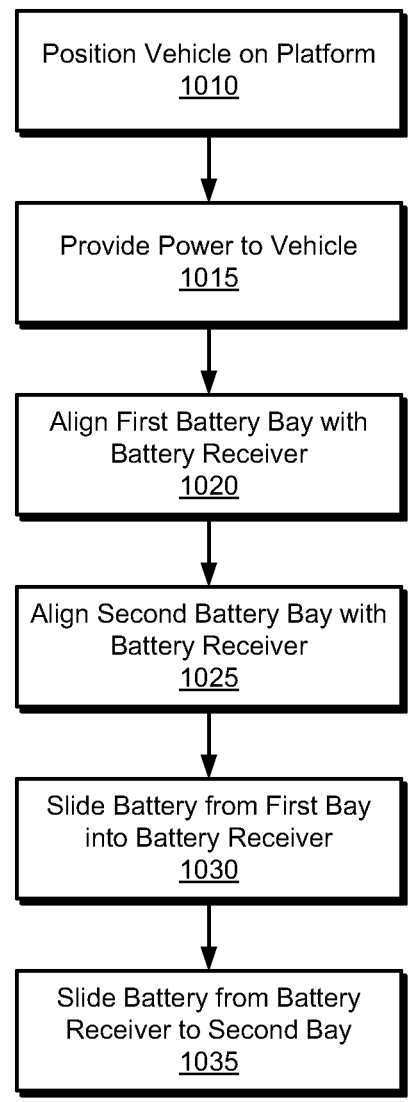
FIG. 10 is a flowchart illustrating operations in a method to replace a battery on a vehicle, according to embodiments.

Having described various structural components of an example vehicle base station, methods of using such a base station will now be described. In some embodiments a vehicle base station as described herein may be used to implement a method to replace a battery on a vehicle, which will be described with reference to FIG. 10.

In use, a vehicle is positioned (operation 1010) on the platform of the housing. In the case of an airborne vehicle such as a UAV or an MAV, the airborne vehicle may be landed directly on the platform. Alternatively, the airborne vehicle may be landed elsewhere and manually positioned on the platform. In the case of a land-based vehicle the vehicle may be driven directly onto the platform or may be driven near the platform then manually positioned on the platform.

When the vehicle is positioned on the platform the alignment assembly may be activated to align vehicle on the platform. In the embodiment depicted in FIGS. 8A-8C one or more locking arms 814 may be activated to position and secure the vehicle on the platform. In some embodiments the locking arms 814 are coupled to a power source to provide power to the vehicle when the vehicle is docked on the platform such that the vehicle is continuously powered (operation 1015) during the battery swapping process.

At operation 1020 a first battery docking station is aligned with the battery receiver coupled to the vehicle, and at operation 1025 a second battery docking station is aligned with the battery receiver. In the embodiment depicted in FIGS. 8A-8C, the first battery bay may be advanced such that a charged battery is aligned with the receiver and the second battery bay may be advanced such that an empty docking station is aligned with the receiver.

At operation 1030 a battery is slid from a docking station in the first battery bay into the receiver. In embodiments in which the battery is housed within a battery carriage as described with reference to FIG. 9A-9C the battery replacement assembly slides a battery carriage from the first battery bay into position in the battery receiver. The battery carriage from the first battery bay displaces the battery carriage in the battery receiver, which, slides (operation 1035) the battery carriage that was secured in the carriage out of the carriage and into the empty battery docking station in the second battery bay.

Thus, described herein are exemplary embodiments of a vehicle loading station and associated methods for using a vehicle loading station. In some embodiments the vehicle loading station comprises a housing which defines at least one platform onto which a vehicle carrying a payload may be positioned. A vehicle docking assembly docks and secures the vehicle on the platform. A batter replacement assembly removes a payload from the vehicle and replaced with a new payload.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A vehicle base station, comprising:
a platform on which a vehicle may be positioned;
a first battery bay located on a first side of the platform;
a battery replacement assembly to remove a battery from the vehicle and to replace the battery with a new battery; and
a power source separate from the battery to provide power to the vehicle while the vehicle is positioned on the platform; and
at least one locking arm to lock the vehicle to the platform, wherein the at least one locking arm comprises at least one power contact to provide power from the power source to the vehicle when the vehicle is positioned on the platform.

2. The vehicle base station of claim 1, further comprising a second battery bay located on a second side of the platform, opposite the first side.

3. The vehicle base station of claim 2, wherein the battery replacement assembly:
slides a battery from the first battery bay onto a battery receiver coupled to the vehicle; and
slides a battery from the battery receiver coupled to the vehicle onto the second battery bay.

4. The vehicle base station 2, wherein the platform is contoured such that gravity causes the vehicle to be positioned in a predetermined location on the platform.

5. The vehicle base station of claim 4, wherein:
the platform comprises a sloped landing plate to receive the vehicle, such that the vehicle settles to the predetermined position under the force of gravity.

6. The vehicle base station of claim 5, wherein the first battery bay and the second battery bay each comprise a rotating drum for housing the battery.

7. A system, comprising:
a battery receiver comprising:
a first frame having a base mountable to a vehicle; and
a channel coupled to the base;
a battery carriage, comprising:
a second frame capable of holding one or more batteries;
a rail mounted on the second frame and adapted to engage the channel coupled to the base of the battery receiver frame; and
a vehicle base station, comprising:
a platform on which a vehicle may be positioned;
a first battery bay located on a first side of the platform;
a second battery bay located on a second side of the platform, opposite the first side;
a battery replacement assembly to remove a battery from the vehicle and to replace the battery with a new battery; and
a power source separate from the battery to provide power to the vehicle while the vehicle is positioned on the platform; and
at least one locking arm to lock the vehicle to the platform, wherein the at least one locking arm comprises at least one power contact to provide power from the power source to the vehicle when the vehicle is positioned on the platform.

8. The system of claim 7, wherein:
the battery carriage comprises at least one electrical contact on the rail; and
the channel comprises electrical contacts positioned to couple with the electrical contacts on the rail when a battery carriage is engaged with the battery receiver.

9. The system of claim 7, wherein:
the battery replacement assembly slides a first battery from the first battery bay onto a battery receiver coupled to the vehicle and to slide a second battery from the battery receiver coupled to the vehicle onto the second battery bay.

10. The system of claim 9 wherein:
the battery replacement assembly drives a first battery carriage housing a first battery from the first battery bay into the battery receiver; and
the first battery carriage displaces the second battery carriage.

11. The system of claim 10, wherein the second battery provides power to the vehicle before the first battery is disconnected from the battery receiver.

12. The system of claim 7, wherein:
the platform comprises a sloped landing plate to receive the vehicle, such that the vehicle settles to the predetermined position under the force of gravity.

13. The system of claim 7, wherein:
the first battery bay and the second battery bay each comprise a rotating drum capable of holding a plurality of batteries.

14. The system of claim 13, further comprising a power source coupled to the first battery bay and the second battery bay to provide power to charge one or more batteries stored in the first battery bay and the second battery bay.

15. A method to replace a battery on a vehicle, comprising:
positioning the vehicle on a platform of a vehicle base station;
providing power continuously to the vehicle while the vehicle is positioned on the vehicle base station by coupling at least one locking arm to lock the vehicle to the platform, wherein locking arm comprises at least one power contact to provide power to the vehicle;
aligning a first battery bay comprising a charged battery with a first side of a battery receiver coupled to the vehicle;
aligning a second battery bay, which is empty, with a second side of the battery receiver, opposite the first side;
sliding a first battery from the first battery bay onto the battery receiver coupled to the vehicle; and
sliding a second battery from the battery receiver coupled to the vehicle onto the second battery bay.

16. The method of claim 15, wherein sliding a first battery from the first battery docking station onto the battery receiver coupled to the vehicle comprises sliding a first battery carriage housing a first battery from the first battery bay into the battery receiver such that the first battery carriage displaces a second battery carriage housing a second battery.

17. The method of claim 16, wherein the second battery provides power to the vehicle before the first battery is disconnected from the battery receiver.

18. The method of claim 15, wherein the first battery bay and the second battery bay each comprise a rotating drum capable of holding a plurality of batteries, and wherein the rotating drums are rotated to align the first battery bay and the second battery bay with the battery receiver.

* * * * *